(No Model.) 3 Sheets—Sheet 1.
B. HEIMSOETH.
CAR COUPLING.
No. 432,734. Patented July 22, 1890.
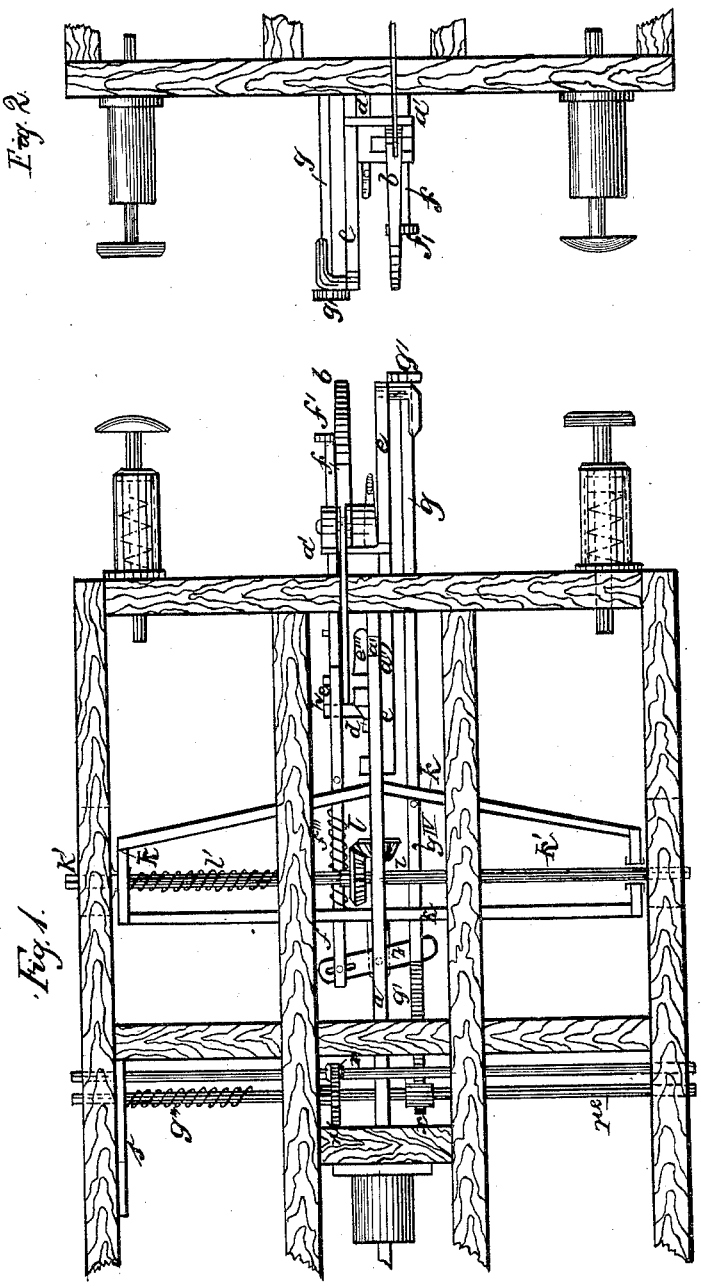

(No Model.) 3 Sheets—Sheet 2.
B. HEIMSOETH.
CAR COUPLING.
No. 432,734. Patented July 22, 1890.
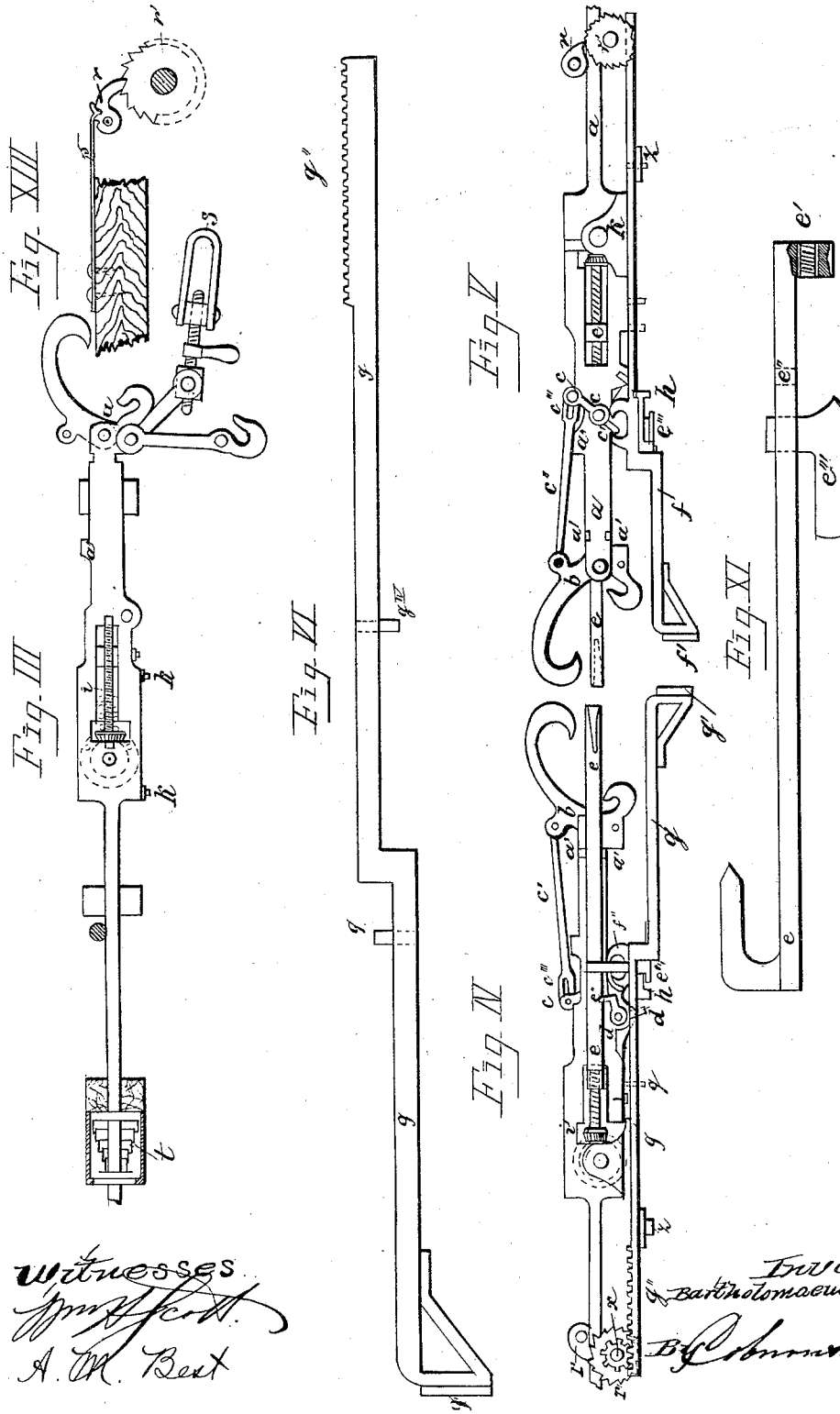

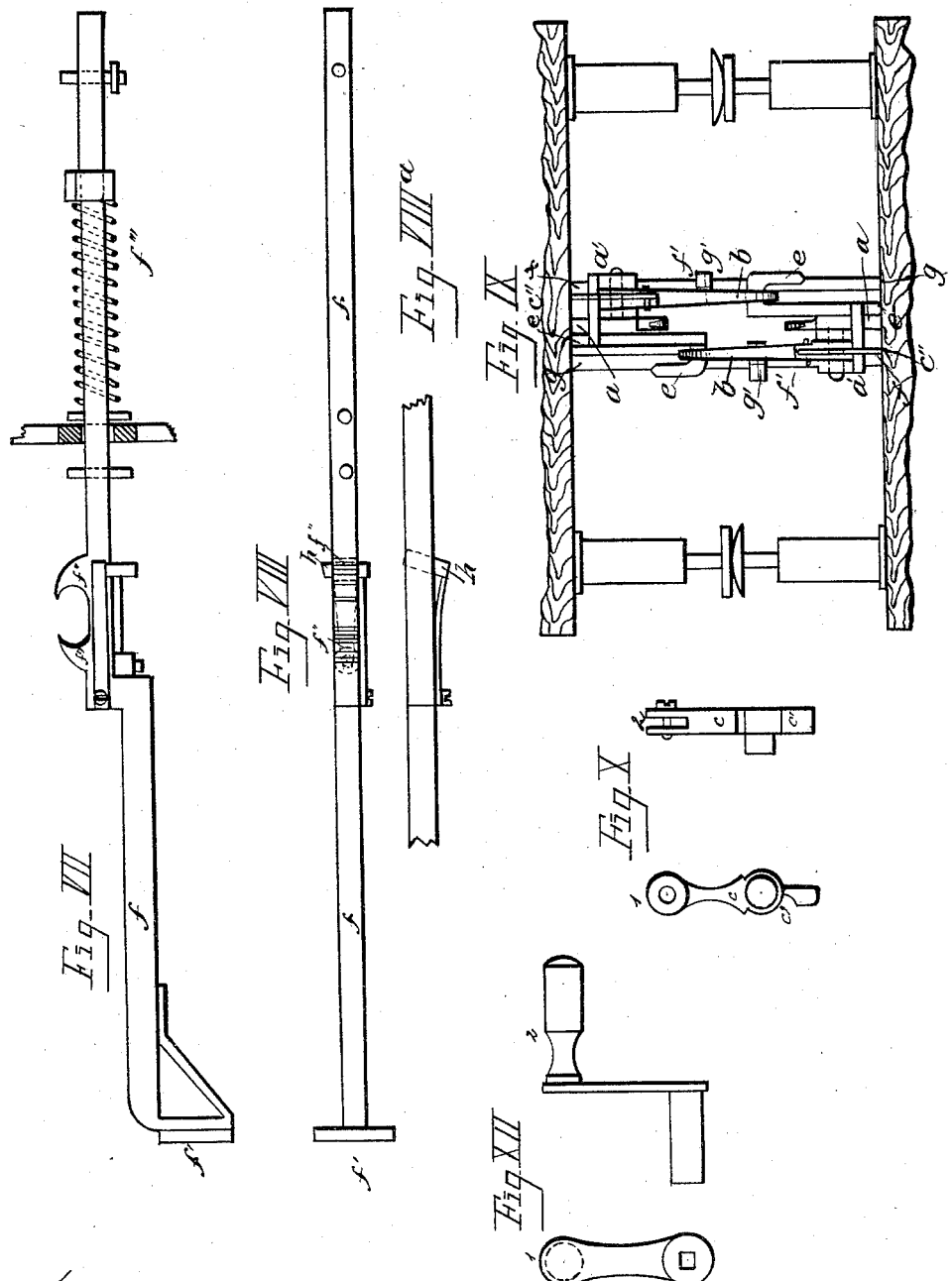

UNITED STATES PATENT OFFICE.

BARTHOLOMAEUS HEIMSOETH, OF COBLENTZ, PRUSSIA, GERMANY.

CAR-COUPLING.

SPECIFICATION forming part of Letters Patent No. 432,734, dated July 22, 1890.

Application filed April 4, 1889. Serial No. 306,042. (No model.)

*To all whom it may concern:*

Be it known that I, BARTHOLOMAEUS HEIMSOETH, of Coblentz, in the Kingdom of Prussia and German Empire, have invented a new and useful Automatic Railway-Carriage Double Coupling with Lateral Coupling, of which the following is a specification, reference being had therein to the accompanying drawings.

My invention relates to automatic railway-carriage double coupling with lateral coupling.

In the drawings, Figures 1 and 2 show in plan parts of two carriages facing one another to be coupled together. Fig. 3 shows in side view the continuous main draft-shaft, together with its working parts and connections, and with the usual coupling connected thereto. Figs. 4 and 5 show in side view the coupling contrivances of two carriages. Fig. 6 shows the buffer-shaft $g$ of the coupling to a larger scale. Fig. 7 shows the buffer-shaft $f$ of the coupling to a larger scale. Fig. 8 is a plan of the buffer-shaft shown in Fig. 7. Fig. $8^a$ shows the middle part of the buffer-shaft $f$, Fig. 8, with the hammer $h$ thrown back. Fig. 9 shows in plan the coupling of two carriages after the coupling has taken place. Fig. 10 shows in front and side views the rocking lever $c$, which actuates the vertical hook $b$. Fig. 11 shows in detail the horizontally-hooked bar $e$ with its disconnector $e^3$. Fig. 12 shows in front and side views the crank-handle which serves to actuate the shafts $k'$ and $r^2$. Fig. 13 shows in side view the pawl movement $r\ r'$, which is operated during the inward movement of the buffer-shaft $g$.

The hereinafter-described coupling for railway-carriages, according to my invention, acts in such a way that by the forcible contact of the carriages against one another an automatic coupling takes place by means of a peculiar catch mechanism, which is arranged in such a way that the coupling arrangement can be rendered inoperative, so that only when in shunting the uncoupling of the carriages takes place. The coupling is applied to carriages provided with a continuous main draft-bar, and is arranged in such a manner that when applied to a carriage such carriage can be coupled to another carriage provided with a different coupling arrangement—for example, when provided with the ordinary coupling.

The automatic railway-coupling, according to my invention, consists as follows: The draft-bar $a$ is provided at any suitable part of its length with a spring $t$, and at both its ends with the usual coupling—for instance, the usual screw-coupling. The draft-bar $a$ is arranged centrally in the carriage framework. On one side of the bar $a$ is arranged the buffer-shaft $f$, (shown in Figs. 7, 8, and $8^a$ in detail,) provided at one end with a disk $f'$, which serves as a buffer.

On the buffer-shaft $f$ there is provided a jaw $f^2$, Fig. 5, in which the lever $c$ engages. The lever $c$ is formed as shown in Fig. 10, and is connected with the vertical hook $b$ through the connecting-rod $c^2$. If the buffer-shaft $f$, by the concussion of the carriages to be coupled, as hereinafter described, is driven back, overcoming the pressure of the spring $f^3$, the lower arm of the lever $c$ is also carried back with it, and in this manner the vertical hook $b$ is lowered. The vertical hook $b$ then takes into the horizontal hook $e$ of the other carriage-coupling. The horizontal hook $e$ can be adjusted longitudinally, being for this purpose provided at $e'$ with a screwed boss, Figs. 3 and 11, into which the adjusting-screw $i$ takes. The screw is worked by means of the bevel-wheels $i'$ and $l$ through the turning of the shaft $k'$. The return action of the hook $e$ takes place automatically through the torsional spiral spring $l'$, which is placed on the shaft $k'$ in such a manner that after the grip of the vertical hook $b$ into the horizontal hook $e$ has been removed the coupling is unlinked, by means of which the free action of the spring $l'$ is returned to it. The coupling arrangement is arranged on both sides of the bar $a$; on one side there is the horizontal hook $e$ and on the other side the buffer-rod $f$, and consists of the following parts: The rod of the horizontal hook $e$ is provided with an incision $e^2$, Figs. 4 and 11, into which the catch $d$ engages. The catch $d$ is operated by the hammer $h$, which latter, acting as a spring, is arranged on the buffer-rod $f$, and which is in its turn operated by the releaser $e^3$, provided upon the horizontal hook $e$.

Opposite the buffer $f'$ of the buffer-shaft $f$ there is arranged a buffer-shaft $g$, which is provided with a buffer $g'$, and which in relation to the buffer $f'$ is arranged correspondingly upon the carriage. The buffer-shaft $g$ has an indented portion where is provided a rack $g^2$, in which works the pinion $x$, which is keyed on the shaft $r^2$. On the shaft $r^2$ there is a torsional spiral spring $g^3$, arranged in such a manner that the buffer-shaft $g$ is returned to its outward position, which position is governed by the stop-pin $q$. The tension of the spring $g^3$ is a greater one than that of the spring $f^3$, which impels outwardly the buffer-shaft $f$. In consequence of this, on the concussion of $f'$ and $g'$, the buffer-shaft $f$ is driven back. On the shaft $r^2$ there is keyed a ratchet-wheel $r'$, into which the pawl $r$ takes. The position of the pawl $r$ is set by the spring-piece $s$.

The action of the whole coupling is as follows: When through the action of the spring $f^3$ the buffer-shaft $f$ is pressed out, and through the action of the spring $l'$ the horizontal hook $e$, and through the action of the spring $g^3$ the buffer-rod $g$ have been pressed out from the carriage as far as possible, (which distance is limited by the pin $q$,) the vertical hook $b$ is at the same time drawn upward by the outward movement of the buffer-shaft $f$ through the action of the lever $c$, working in the jaw $f^2$.

To couple the carriages, they are brought into contact, the buffer $f'$ with the buffer $g'$, and thereby the buffer-shaft $f$ is driven back to within two centimeters of the full extent of its travel. By the consequent retrogression of the jaw $f^2$, Fig. 5, the lever $c$ throws the vertical hook $b$ into the horizontal hook $e$, presented before it. At the same time the hammer $h$ on the buffer-shaft $f$ knocks the catch-piece $d$ out of the incision $e^2$ on the horizontal hook $e$, in consequence of which action the spring $l'$, being under torsion, draws the horizontal hook $e$ back by means of the rod $k'$, and the bevel-wheels $l$ and $i'$ turning the screw $i$ in the screwed provision $e'$, while the releaser $e^3$, attached to the receding horizontal hook-rod $e$, presses back the hammer $h$ on the rod $f$, so that it releases the catch $d$. The spring $l'$ draws back the horizontal hook $e$ as far as the inner circle of the mouth of the vertical hook $b$, whereby the carriages, according to the regulation for passenger-express trains, travel with close buffers.

In uncoupling, on turning the rod $k'$ by means of the crank-handle shown in Fig. 12 the horizontal hook $e$, through the bevel-wheels $l$ and $i'$ and the screw $i$, is pushed forward until the catch $d$ takes into the incision $e^2$ on the hook-rod $e$, which is caused by the releaser $e^3$ placing the hammer $h$ out of contact with the catch $d$. Upon the separation of a carriage the pressed-back buffer-shaft $f$ is liberated and is then pressed out by the spring $f^3$, in consequence of which action the vertical hook $b$, which has been acted upon by the lever $c$ working in the jaw $f^2$, is lifted up. Through the buffer-shaft $f$ springing out the hammer $h$ engages with the catch $d$, and the coupling is ready for another carriage.

In the connecting-rod $c^2$, Figs. 4 and 5, there is provided a slot $c^3$, by means of which the vertical hook $b$, when loaded and empty carriages come together, can yield to suit the different elevations of the hooks $b$ and $e$.

The two-centimeter space above referred to, which exists when traveling with close buffers, between the head of the buffer-shaft $f$ and the draft-rod $a$, allows for the play caused in traveling round a curve, as thereby the center of the draft-rod $a$ is movable backward, and the coupling yields to right and left and will not break. By pressing the buffers back to within two centimeters the buffers can on the inner side of the curve be compressed nearly to twenty centimeters. The jaw $f^2$ will not press the lever $c$ back beyond a certain point—that is, where the jaw $f^2$ enters the cut-away portion $c'$, Fig. 10. In consequence of this the movement of the buffer-shaft $f$ reaches a dead-point and has no further influence on the rod $c^2$ and vertical hook $b$, but leaves free play to the latter.

In order to uncouple carriages when shunting or separating trains, it is only necessary to draw back the buffer-shaft $g$ on the last carriage. This is done by turning the shaft $r^2$ with the crank-handle shown in Fig. 12, and the pawl $r$ being in gear with the pawl-wheel $r'$ the reaction of the pressed-back buffer-shaft $f$ is prevented, so that the pin $g^4$ on the buffer-shaft $g$ comes in contact with the cross-lever $z$, which is fulcrumed at its center and is in connection with the buffer-shaft $f$. This action brings the two buffers $f'$ and $g'$ side by side, and as they now stand in rear of the wagon-buffers there is no consequent connection of the carriages. After the shunting of the carriage the pawl $r$ is raised out of gear with the wheel $r'$ by turning the shaft $r^3$ by the aid of the crank-handle shown in Fig. 12, and thereby the spring-operated buffer-shaft $g$ is again put into its extreme outward position. By hard concussion of the carriages this buffer-shaft $g$ is pressed back and the vertical hook $b$ is pressed down by the jaw $f^2$ on the buffer-shafts $f$ and $g$ pushing against one another.

For the coupling of an old wagon supplied with an ordinary coupling to a new wagon provided with a coupling according to this invention, the buffer-shaft $g$ is drawn back by turning the shaft $r^2$ by means of a crank-handle, such as shown in Fig. 12, and the old coupling can then be hooked and attached, as usual.

What I claim, and desire to secure by Letters Patent of the United States, is—

1. In automatic couplings for railway-carriages, a spring draft-bar, in combination with the buffer-shaft $f$, provided with a spring $f^3$, the vertical hook $b$, the horizontal hook $e$, the lever $c$, catch $d$, spring $l'$, rod $k'$, bevel-wheels $l$ and $i'$, the buffer-shaft $g$, the shaft $r^2$, and spring $g^3$, substantially as and for the purposes specified.

2. In automatic car-couplings, the spring draft-bars, in combination with a vertical hook on one carriage, a horizontal hook on the adjacent carriage, and the spring-buffers $f'$ and $g'$, the former being connected with the vertical hook and actuating it by its movement, substantially as and for the purposes specified.

3. In automatic car-couplings, the hooks $b$ and $e$, in combination with the buffer-shaft $f$, the jaw $f^2$ on said shaft, and the lever $c$, provided with the notch $c'$, whereby the hooks are caused to grip at different elevations, substantially as and for the purposes specified.

4. The buffer-shaft $f$, in combination with the hammer $h$, arranged thereon, the bar of the horizontal hook $e$, provided with the niche $e^2$, the releaser $e^3$ on said bar, and the catch $d$, substantially as and for the purposes specified.

5. In automatic car-couplings, spring draft-bars, in combination with a vertical hook $b$ on one car, a horizontal hook $e$ on the adjacent car, the spring buffer-shaft $f$, the spring buffer-shaft $g$, the shaft $r^2$, the pawl-wheel $r'$, the lever $z$, and the contact-pin $g^4$, substantially as and for the purposes specified.

In witness whereof I have hereunto set my hand in presence of two witnesses.

BARTHOLOMAEUS HEIMSOETH.

Witnesses:
NICOLA HEIMSOETH,
GUSTAVE ALBERT OELRICHS.